July 31, 1934.  H. L. FINLEY  1,968,194
THERMOSTATIC CONTROL
Filed Sept. 22, 1933
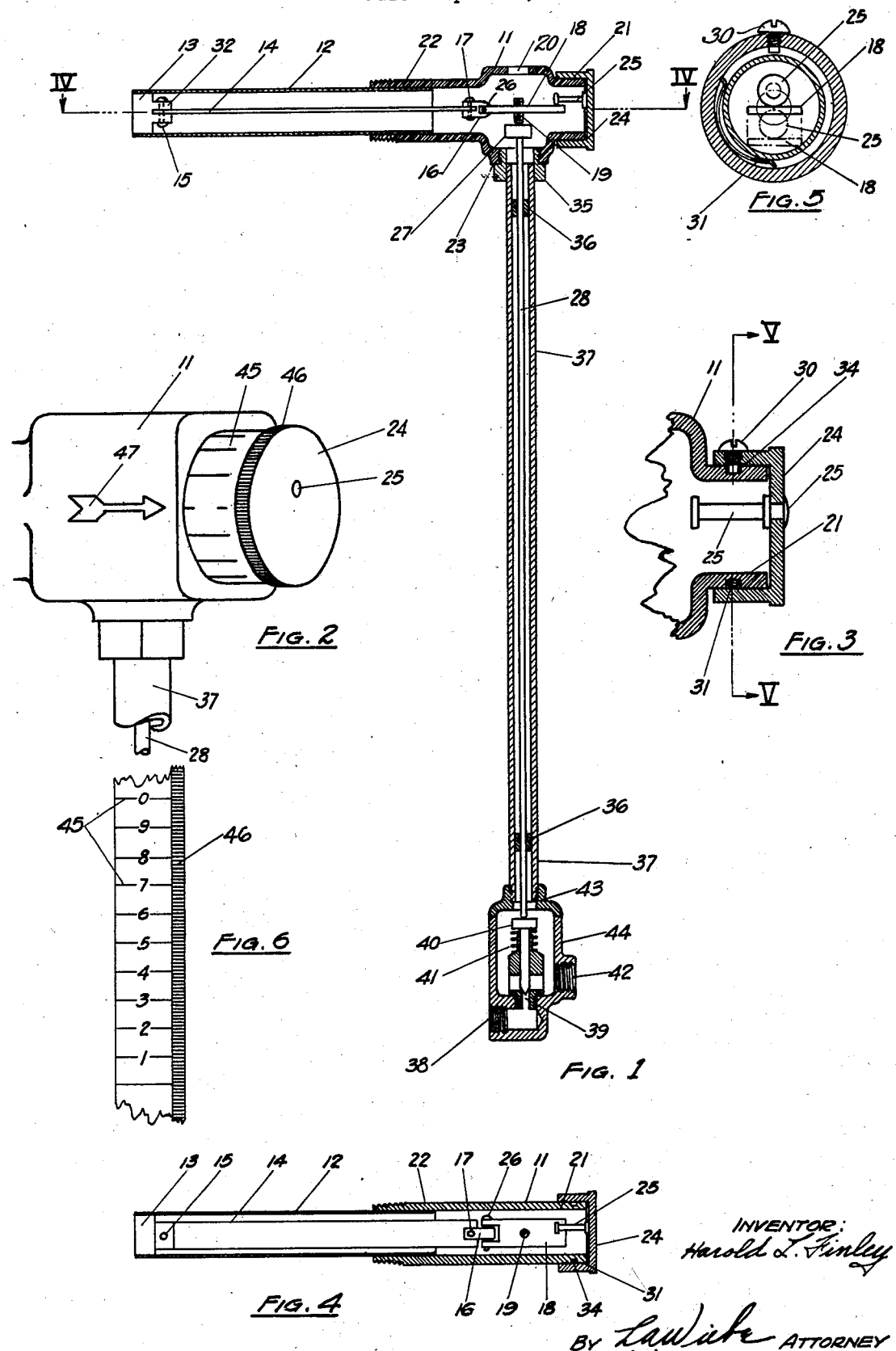
INVENTOR:
Harold L. Finley
BY  L. A. White ATTORNEY Patented July 31, 1934

1,968,194

UNITED STATES PATENT OFFICE 1,968,194

THERMOSTATIC CONTROL

Harold L. Finley, La Porte, Ind., assignor to The Lonergan Manufacturing Company, Inc., a corporation of Indiana Application September 22, 1933, Serial No. 690,542

12 Claims. (Cl. 236—101)

My invention relates to improvements in a thermostatic control for the regulation and control of the flow of fuel to fuel burners. The thermostatic device according to my invention is particularly suitable for use in heating appliances in which the flow of fuel to the burner is automatically started and stopped in accordance with the temperature of the medium to be heated, and in which ignition means are provided for the periodic ignition of the burner. This invention is moreover particularly suitable for use in the regulation of liquid fuel in liquid fuel burners of the type in which continuously burning pilot lights are provided for the ignition of the main burner.

The object of the present invention is the construction of a thermostatic control of an efficient and rugged nature, which will operate in a particularly desirable manner in liquid fuel burners.

Another object of my invention is the construction of a thermostatic control having a minimum number of working parts and at the same time having the requisite smoothness and flexibility of operation, and which will not be easily damaged or be thrown out of adjustment in handling.

A further object of my invention is the construction of a thermostatic control in which means are provided for easily and quickly adjusting the same for operation at various desired temperatures.

A still further object of the present invention is the construction of a thermostatic control which is adapted to start and stop the flow of fuel with the particular necessary speed for maximum ease and smoothness of ignition of the burner.

In order to more clearly visualize and understand the present invention, reference is made to the following description taken in connection with the accompanying illustrations of one specific embodiment of the invention, and in which:

Fig. 1 is a vertical sectional view of the thermostatic control and its connection with a throttling, fuel regulating valve.

Fig. 2 is a perspective view of the body of the thermostatic control showing the means for adjusting the same.

Fig. 3 is an enlarged vertical sectional view of a portion of the thermostatic control showing the relationship of the adjusting cap to the body of the control.

Fig. 4 is a horizontal sectional view of the thermostatic control, taken on line IV—IV of Fig. 1.

Fig. 5 is a sectional view of the control taken on line V—V of Fig. 3.

Fig. 6 is a diagrammatic view illustrating a development of a scale inscribed on the adjusting cap.

Referring to the drawing, 11 designates a body member which may be constructed in any desired manner, but is preferably made as a casting to provide the necessary rigidity. The body 11 is constructed with an extension 22 which is externally threaded at its extremity for screw connection with a receptacle or other means containing the medium to be heated, such as water or the like. The extension 22 is provided with a smooth internal bore for the reception of a heat conducting tube 12. This heat conducting tube is fixedly connected to said extension 22 by sweating, soldering or any other desired manner. The heat conducting tube 12 is provided at its opposite end with a plugging or anchoring element 13. The element 13 has a rigid connection with the tube 12 and has a forked projection 32 which together with a pin 15 serves as a means for anchoring one end of a duo-metallic thermostatic element of well-known construction. One end of a coupling member 16 is fixed to the other end of the thermostatic element 14 by means of a pin 17. The other end of the coupling member 16 is pivoted to an adjustably located key plate 18.

The body 11 is provided with a second extension 21, having a circumferential groove 34. A cap 24 having a projecting annular flange thereon is removably positioned on said extension 21 for relative rotation therewith and for covering the open end of said body extension 21. A guide screw 30 is positioned in the flange of the cap 24 for cooperation with the groove 34 to prevent the cap from being removed from the said extension but nevertheless permitting a relative rotation between the cap and extension. An adjustable temperature regulating pin member 25 is eccentrically mounted in the cap 24, said pin projecting into the thermostat body to contact one end of the key plate member 18.

A leaf spring 31, which is normally bent in the form of a semi-circle, is positioned in the groove 34 to exert a pressure between the extension 21 and the annular flange of the cap 24. The purpose of this spring is to maintain a certain braking action between the cap 24 and the extension 21.

An externally threaded adjusting pin 19 is adjustably positioned substantially in the center of the key plate 18. The pin 19 is adapted to rest on the head 27 of a motion-transmitting rod 28, and serves the purpose of connecting the various adjusting elements of the thermostatic control to each other. An opening 20 is provided in the top wall of the thermostat body 11, directly above the pin 19, whereby a screw-driver or other suitable tool may be inserted for the adjusting of the pin 19. A bushing 35 is positioned in the lower extension 23 of the thermostatic body. A tube 37 is adapted to project into or be connected in any desired manner to a fuel container which is preferably provided with a spring-pressed throttling valve. In the modification illustrated the tube 37 is screwed into the top 43 of a fuel containing chamber 44 which is provided with fuel inlet and fuel outlet connections 42 and 38 respectively. A valve-stem 40 is positioned above a valve seat 39 and is normally maintained in its open position by means of spring 41. The motion-transmission rod 28 is adapted to rest on the valve stem 40, the spring 41 being provided with sufficient strength to support the weight of the rod 28 and the stem 40. It will be noted that the actuating thermostatic element 14, the motion-transmitting rod 28, the adjustable temperature regulating pin 25 and the adjusting pin 19 are all in direct contact with the key plate 18 whereby all motion is transmitted and adjustments are made through this plate 18.

An arrow 47 (see Fig. 2) is provided on one side of the valve body 11 for indicating the relative adjustment of the cap 24 on the body extension 21. A portion of the outer periphery of the cap 24 is knurled to provide a means for gripping the same for rotation. A further portion 45 of the outer periphery of the said cap is divided by means of suitable markings into a series of sections which indicate approximately equal ranges of temperature adjustment.

The specifically illustrated and described thermostatic control is merely an example of one embodiment of a suitable construction. Obviously many modifications varying from the specific form disclosed may be produced without departing from the spirit of the invention.

The operation of the thermostatic control is substantially as follows:

The tube 12 is placed in contact with the medium to be heated, which for example may be the water in a water heater. When this medium to be heated is cold the thermostatic element 14 remains in a predetermined, previously adjusted position. At this position the spring 41 holds the valve stem 40 in its open position, the motion-transmitting rod 28 being raised accordingly. The adjusting screw 19 is now adjusted by means of a tool inserted in the opening in the top of the thermostatic body 11 so as to barely contact the head 27 of the rod 28.

As soon as the temperature of the heated medium rises, the end of the thermostatic element connected to the coupling 16 is lowered. The end of the plate 18 which is coupled to the thermostatic element is obviously lowered accordingly, while the opposite end of the plate 18 is held stationary by the adjusting pin 25. Upon lowering of the plate 18, the adjusting screw 19 is forced against the head 27 of the rod 28, which in turn presses the valve stem 40 onto its seat 39 against the action of the coil spring 41. As soon as the heated medium is again cooled the thermostatic element rises and the spring 41 again lifts the valve stem 40 and the motion-transmitting rod 28 thereby starting the flow of oil through the fuel container 44.

In order to adjust the thermostat for any particular desired range of temperature to which the medium is to be heated, the cap 24 is rotated on the extension 21. As previously set forth the pin 25 is eccentrically mounted in the cap 24. Upon rotating the cap, the pin 25 will obviously be raised and lowered a distance equal to twice the radius of the eccentricity, whereby the plate 18 in contact with the pin 25 will be raised or lowered an equal distance, as is clearly shown by the dotted lines in Fig. 5.

It is to be understood that the specific embodiment of the invention illustrated and described may be varied in many details of its construction within wide limits without departing from the spirit of the invention, and that the invention is to be limited only within the terms of the appended claims.

I claim:

1. A thermostatic control which comprises in combination, a body member, a heat conducting tube fixed to said body member and projecting therefrom, means for fixing one end of a temperature-actuated element to the projecting end of said tube, a motion-transmitting element projecting into said body member, an adjustable temperature regulating member projecting into said body member, and a key member pivotally connected to the other end of said temperature-actuated element and contacting said motion-transmitting element and said temperature regulating member, for the relative adjustment of said elements and members to each other.

2. A thermostatic control which comprises in combination, a body member, a heat conducting tube fixed to said body member and projecting therefrom, means for fixing one end of a temperature-actuated element to the projecting end of said tube, a motion-transmitting element projecting into said body member, an adjustable temperature regulating member projecting into said body member, a key member pivotally connected to the other end of said temperature-actuated element, and contacting said motion-transmitting element and said temperature regulating member, for the relative adjustment of said elements and members to each other, and means for adjustably positioning said key member.

3. A thermostatic liquid fuel control which comprises in combination, a body member, a temperature-actuated element in said body member, a heat conducting member connected to said element, means for connecting said element to an adjustable key plate, means for adjusting said key plate to the desired temperature range, a liquid fuel conduit, a valve mechanism for closing said conduit, and a motion-transmitting element between said valve mechanism and said key plate for imparting motion from said key plate to said valve mechanism.

4. A thermostatic liquid fuel control which comprises in combination, a body member, a temperature-actuated element, a heat conducting member fixed to said body member, means for connecting said element to said heat conducting member, means for pivotally connecting said element to an adjustable key plate, means rotatably connected to said body member, eccentrically fixed means on said rotatably connected means for adjusting said key plate to the desired temperature range, a liquid fuel conduit, a valve mechanism for closing said conduit, and a motion-transmitting element between said valve mechanism and said key plate for imparting motion from the key plate to said valve mechanism.

5. In a thermostatic control in combination, a body member, a temperature-actuated element, heat conducting means for connecting said element to said body member, one end of a key plate connected to said element, a rotatably adjustable member connected to said body member, an eccentrically positioned projection fixed to said adjustable member, said projection adapted to bear upon the other end of said key plate, and a motion-transmitting member in contact with the central portion of said key plate.

6. In a thermostatic control in combination, a body member, a temperature-actuated element, means for connecting said element to said body member, one end of a key plate connected to said element, adjusting means positioned substantially centrally of said key plate, a rotatably adjustable member connected to said body member, an eccentrically positioned projection fixed to said adjustable manner, said projection adapted to bear upon the other end of said key plate, and a motion-transmitting member in contact with the adjusting means in said key plate.

7. In a thermostatic control in combination, a body member, a temperature-actuated element, means for connecting said element to said body member, one end of a key plate connected to said element, a rotatably adjustable member connected to said body member, braking means positioned between said adjustable member and said body member, an eccentrically positioned projection fixed to said adjustable member, said projection adapted to bear upon the other end of said key plate, and a motion-transmitting member in contact with the central portion of said key plate.

8. In a thermostatic control in combination, a body member, a temperature-actuated element, means for connecting said element to said body member, one end of a key plate connected to said element, adjusting means positioned substantially centrally in said key plate, means for actuating said adjusting means, a rotatably adjustable member, connected to said body member, an eccentrically positioned projection fixed to said adjustable member, said projection adapted to bear upon the other end of said key plate, and a motion-transmitting member in contact with the adjusting means in said key plate.

9. In a thermostatic control in combination, a body member, a temperature-actuated actuating element connected to and projecting into said body member, an adjustable projection extending into said body member, a key plate within said body member, said temperature-actuated element and said projection bearing on opposite ends of said key plate, and a motion-transmitting element directed against the key plate intermediate said opposite ends thereof.

10. In a thermostatic control in combination, a body member, a temperature-actuated actuating element, a heat conducting member for connecting said body member to said thermostatic metal element, the latter projecting into said body member, an adjustable projection extending into said body member, a key plate within said body member, said temperature-actuated element and said projection bearing on opposite ends of said key plate, an adjusting means in said key plate intermediate said opposite ends, and a motion-transmitting element directed against the adjusting means in said key plate.

11. In a thermostatic control in combination, a heat-conducting member, a temperature-actuated element attached at one end thereof to said member, one end of a plate pivotally attached to the opposite end of said element, an eccentric regulating member contacting the opposite end of said plate, and means for adjusting said regulating member.

12. In a thermostatic control in combination, a heat-conducting member, a temperature-actuated element attached at one end thereof to said member, a plate pivotally attached to the opposite end of said element, a valve, a valve stem, said plate adapted to actuate said valve stem, an eccentric regulating member contacting said plate, and means for adjusting said regulating member.

HAROLD L. FINLEY.